United States Patent [19]

Wharton

[11] 4,245,927
[45] Jan. 20, 1981

[54] LAYING OF PIPES OR CABLES IN A BED OF MATERIAL

[75] Inventor: William Wharton, Near Hemel Hempstead, England

[73] Assignee: Wharton Engineers (Elstree) Limited, Hertfordshire, England

[21] Appl. No.: 958,584

[22] Filed: Nov. 7, 1978

[51] Int. Cl.³ ............................................. F16L 1/04
[52] U.S. Cl. .................................. 405/163; 405/161; 405/164
[58] Field of Search ............... 405/164, 157, 158, 159, 405/161, 162, 165, 174, 175, 178, 182; 37/193

[56] References Cited

U.S. PATENT DOCUMENTS

| 178,231 | 6/1876 | Campbell | 405/181 |
|---|---|---|---|
| 1,854,617 | 4/1932 | Maloon | 405/183 |
| 2,795,111 | 6/1957 | Richardson | 405/161 |
| 2,875,585 | 3/1959 | Little | 405/161 |
| 3,339,368 | 9/1967 | Ezoe et al. | 405/164 |
| 3,423,946 | 1/1969 | Maclay | 405/164 |
| 3,456,450 | 7/1969 | Teichmann | 405/181 |
| 3,824,798 | 7/1974 | Shiroyama et al. | 405/164 |
| 3,898,852 | 8/1975 | Ezoe et al. | 405/164 |

Primary Examiner—Dennis L. Taylor
Attorney, Agent, or Firm—Robert H. Epstein

[57] ABSTRACT

A method of and apparatus for laying a pipe or cable in a bed of material. There is provided an elongated generally straight tube having a plurality of cutter means mounted in generally parallel spaced relationship with one another along the outer surface of the tube. The cutter means is adapted to remove material by shaving to form a trench when the tube is moved along the bed of material. There is provided adjustable skid means mounted on the tube. The tube or cable to be laid is received by the tube, so that, during movement of the tube, the tube or cable is laid in the trench.

11 Claims, 11 Drawing Figures

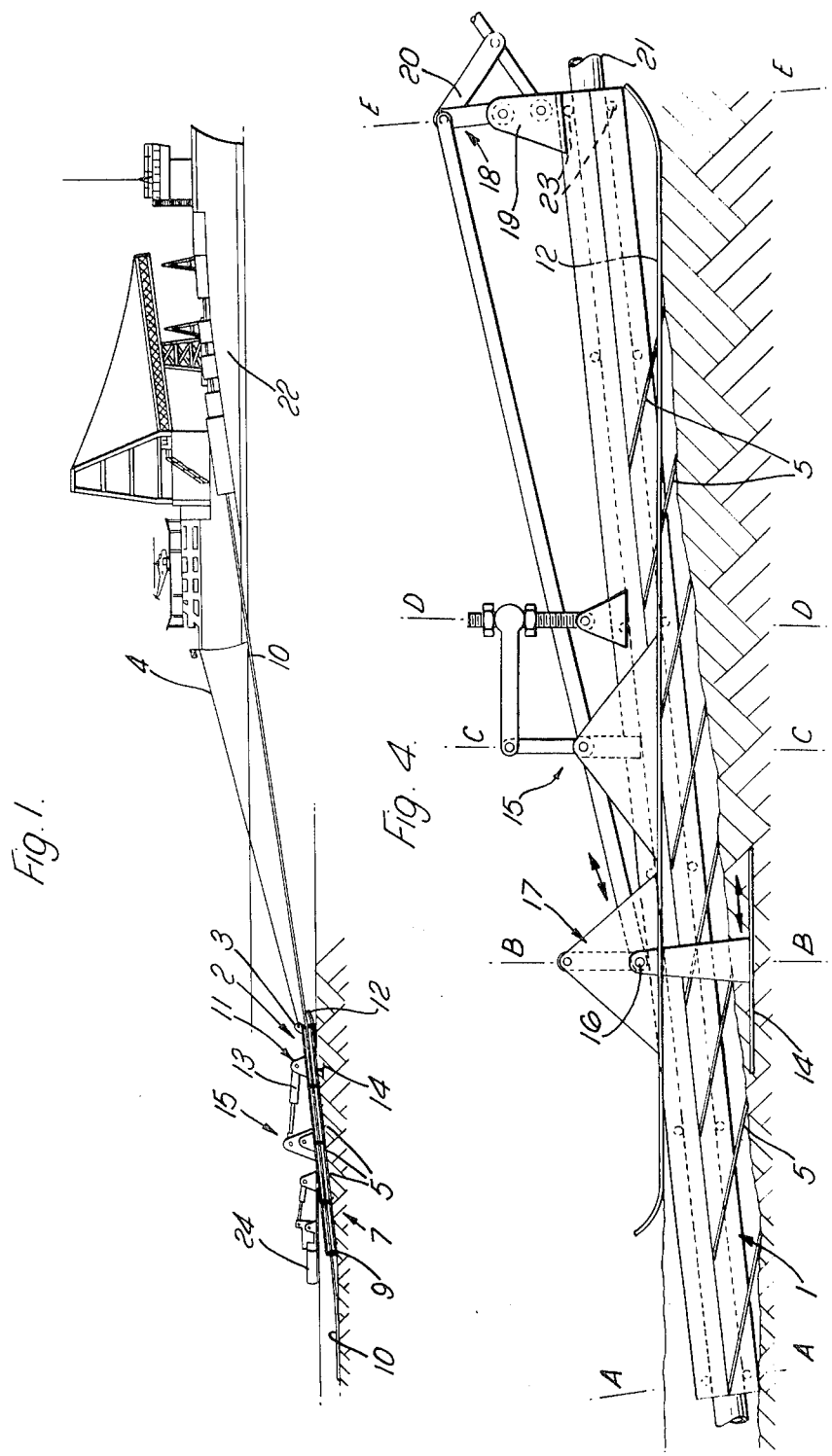

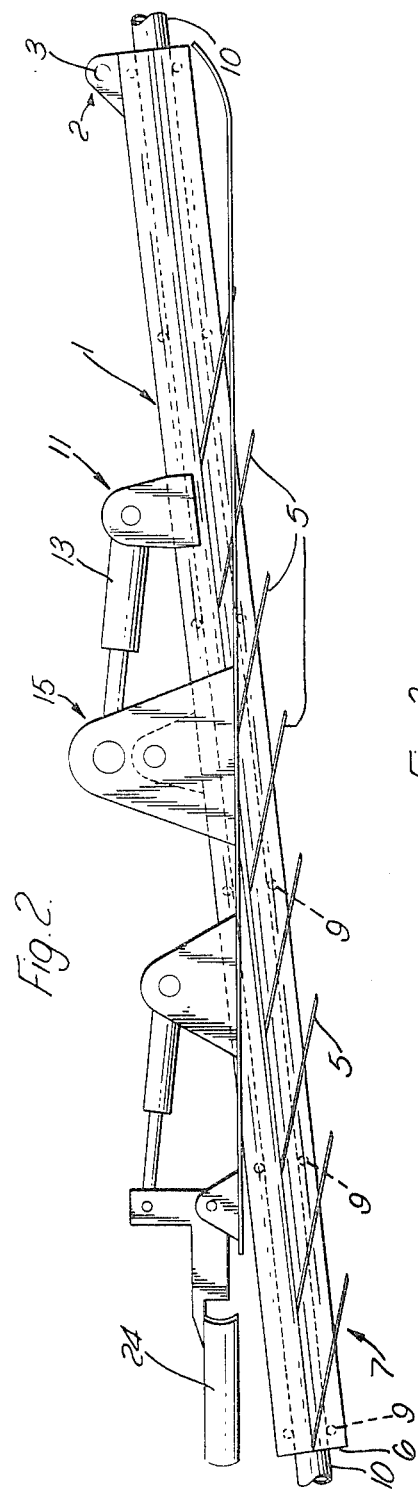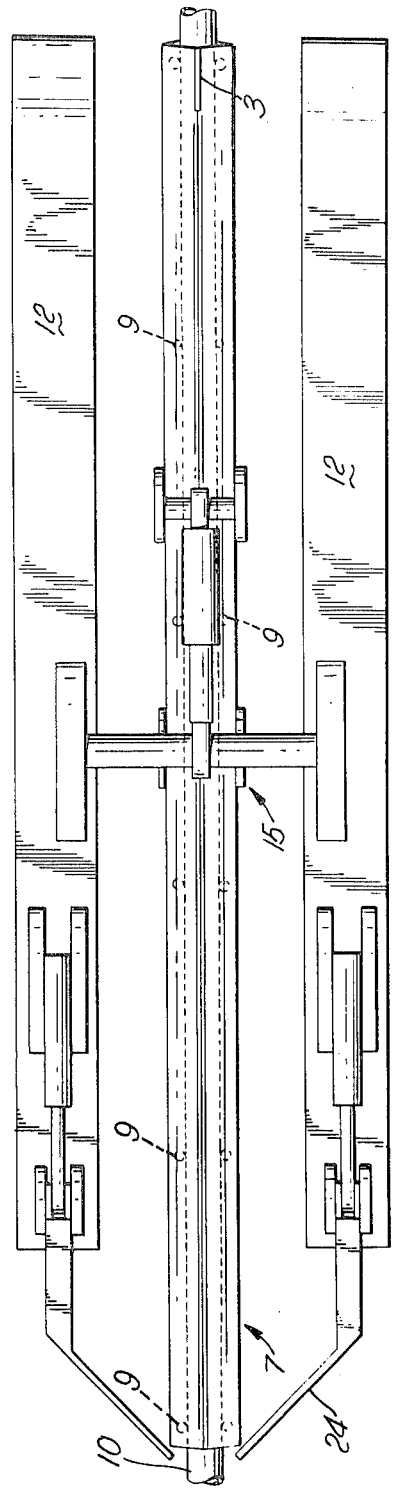

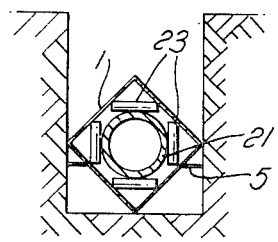
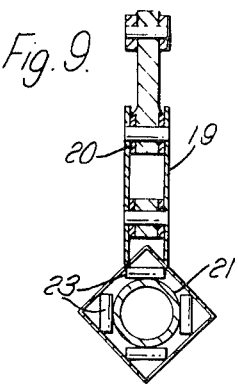
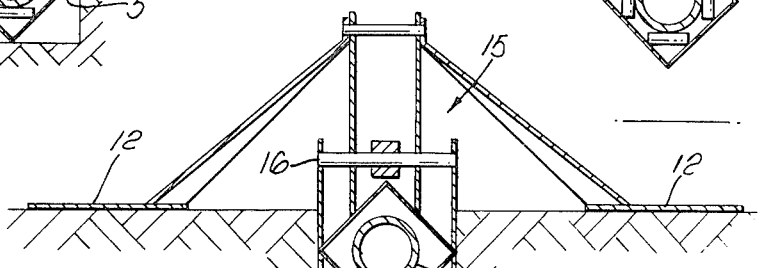
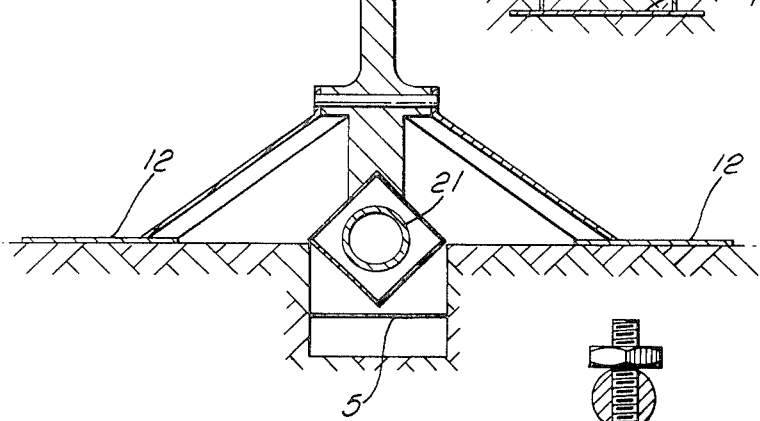
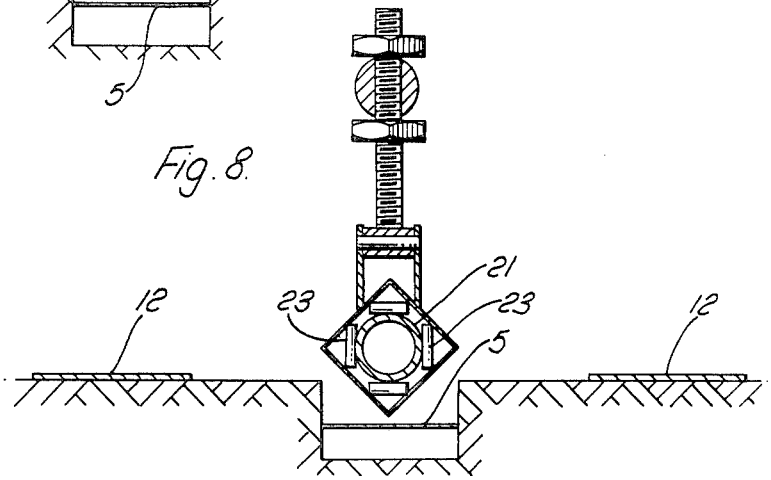

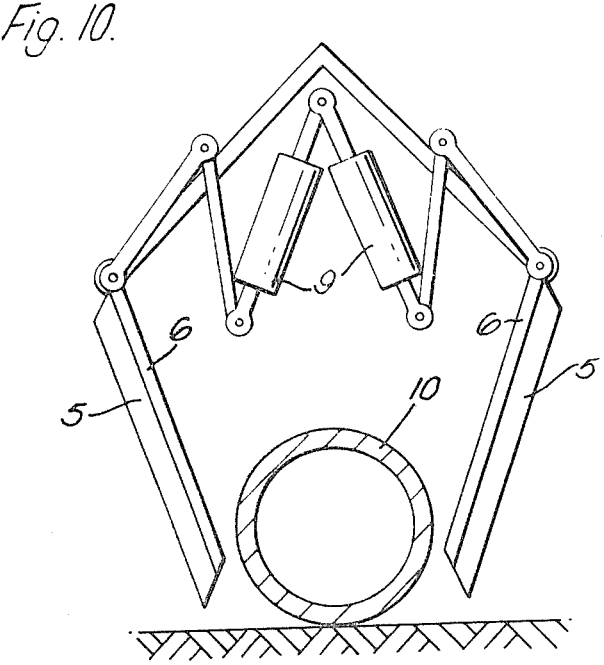
Fig. 10.
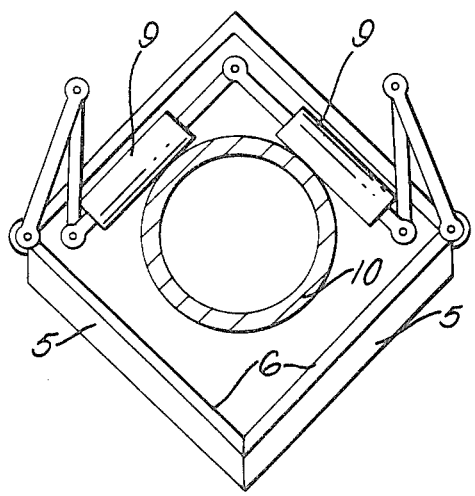

LAYING OF PIPES OR CABLES IN A BED OF MATERIAL

This invention relates to a method of and apparatus for laying a pipe or cable in a bed of material. The invention is particularly but not exclusively concerned with the laying of pipes or cables in a sea or river bed.

Pipes to be laid in a sea bed normally have an outer coating of concrete and such pipes must be laid carefully in the sea bed to prevent damage.

Hitherto, pipes have been laid in a sea bed by resting the pipes on the surface of the sea bed and then blasting regions of the sea bed adjacent the pipes with an air or water jet, to displace material from the sea bed, whereupon the pipes settled into the sea bed. A disadvantage of this method of laying pipes is that the depth to which the pipes settle into the sea bed is variable and cannot be controlled precisely. Furthermore, the speed of pipe laying is rather slow.

British Patent No. 920,720 has suggested a cable laying apparatus, but with the jointed pipe which cannot be controlled in any way, for example in dependence of the softness of the soil. British Patent No. 1,117,333 discloses a similar cable laying apparatus, again with no depth control. However, when laying a pipe or cable on a sea bed it is generally necessary that the pipe be laid at a relatively uniform depth, to ensure adequate soil coverage and enable recovery if necessary. Also, laying a pipe or cable to an unnecessary depth wastes a considerable amount of energy.

It is an object of the present invention to overcome, or at least mitigate, the aforementioned disadvantages.

According to the first aspect of the present invention there is provided a method of laying a pipe or cable in a bed of material, which method comprises moving an elongated generally straight tube along the bed of material so that a plurality of cutter means mounted in generally parallel spaced relationship with one another along the outer surface of the tube removes material from the bed of material to form a trench therein, said cutter means shaving the material, a leading end portion of the tube being disposed above the surface of the bed of material and a portion of the other end of the tube being disposed below the surface of the bed of material, the depth of dig being controllable by virtue of adjustable skid means mounted on the tubes, and supplying the pipe or cable to be laid, during movement of the tube, through the tube from the leading end thereof to the other end thereof and thence into the base of the trench formed.

According to the second aspect of the present invention there is provided an apparatus for laying a pipe or cable in a bed of material, which apparatus comprises an elongated generally straight tube having a plurality of cutter means mounted in generally parallel spaced relationship with one another along the outer surface thereof, the cutter means being adapted to remove by shaving material from a bed of material to form a trench therein when the tube is moved, along the bed of material, adjustable skid means being mounted on the tube whereby the leading end portion of the tube is disposed, in use, above the surface of the bed of material and a portion of the other end of the tube is disposed, in use, below the surface of the bed of material and whereby the depth of dig can be controlled, the tube being adapted to receive the pipe or cable to be laid in the bed of material, which pipe or cable is supplied during movement of the tube, through the tube from the leading end thereof to the other end thereof and thence into the trench formed by the cutter means.

It is important that the material be shaved away from the bed of material, shaving the material out taking approximately one fifth the force required to cut the same amount of material in one ploughing movement. For example in 11% water clay with a sample of apparatus according to the present invention to make a trench five feet wide and eight feet deep requires a force of 24.8 tons instead of the expected 120 to 130 tons and in 14% water clay only 18.8 tons is required with the shaving method. By shaving instead of hacking out, one will not normally need vibration of the cutter means but this can be provided through appropriate ropes if so required. It may in fact be advisable in certain circumstances to vibrate the whole apparatus, at for example 5 to 7 cycles per second. Additionally, one could if required use water jets to assist the cutting of the cutter means and in certain circumstances it may be advantageous to use water and air jets to assist the cutting.

The tube through which the pipe passes protects the pipe during laying thereof and helps to prevent material entering the pipe. The open end of the pipe is on the lay barge in under sea oil field work. Rather than stopping the protective pipe just above the surface of the bed of material, the pipe can be extended if so desired well away from the sea bed. This is most likely to be of advantage when there is a distinct danger of disturbed material from the bed of material entering the tube around the pipe, possibly causing damage to rollers for the pipe in the tube or, more likely, causing damage to the pipe itself.

Preferably, the tube is dragged along the bed of material in a substantially vertical plane containing the axis of the tube. Advantageously, the tube is of generally rectangular cross-section and, when the tube is being dragged along the sea bed, the orientation of the tube is such that the walls of the tube are inclined, when viewed in a vertical section through the tube, at an angle of approximately 45° to a horizontal plane. The outer surfaces of a lower pair of adjacent walls of the tube are provided with tines which extend from said surfaces in a direction towards the leading end of the tube.

Since one requires an apparatus for laying a pipe or cable not guided by the pipe or cable but an apparatus that guides the pipe or cable, it is advantageous to be able to drop the apparatus over the pipe or cable to be laid. The cutter means would dig into the bed of material and close over the pipe.

Additionally, hydraulic means could be provided to assist closure of the bottom of the tube.

One must be extremely careful not to overbend a pipe. One example of two feet diameter pipe cannot be bent more than about a circle having a radius of 200 feet and in such circumstances one would normally require up to 250 feet of cutter means to enable such a pipe to be safely positioned in an 8 foot trench in a bed of material. In this circumstance, one could arrange a series of apparatus according to the invention linked together, with the front of the second tube being attached to the rear of the first tube and so on. Alternatively, one could loosely link together a series of tubes with digger means with a skid unit at the front and rear. Advantageously, such units of cutter means would be hinged together at the top and bottom. Even if one had a single 200 foot length of tube with cutter means, this would naturally bend sufficiently over its length to allow a 2 foot pipe to be laid at the correct angles.

It is advantageous to provide a skeleton plough ahead of the skid to remove boulders, the plough being just wider than the path of the pipe. Advantageously a wide front skid is provided, particularly when to be used in high water content mud. It is possible to combine the skeleton plough with an over steering device to steer equipment back onto the required pipe line course. In this connection, it should be noted that it is highly desirable to use two towing ropes, crossed over one another so that accurate towing of the apparatus according to the invention is readily feasible.

As previously mentioned, rollers are preferably mounted inside the tube for guiding the pipe therethrough. Since the leading end of the tube is disposed above the surface of the bed of material, little material ingresses in the leading end of the tube and since the pipe or cable is passing out of the trailing end of the tube, there is little ingress of material therein. The rollers are therefore operating in a relatively solid material-free zone.

Advantageously, skids are provided on the apparatus, disposed on either side of the tube for sliding over the surface of the bed of material, preferably the sea bed. Preferably, means are provided for varying the height of the skid above the trailing end of the tube so that the depth of the trench can be varied. To this end, the skids may be pivotally supported in respect to the tube and a ram or jack may be provided for varying the inclination of the tube relative to the skids. In order to maintain the skids on the surface of the sea bed and to ensure that the skids exert a downward pressure on the surface of the sea bed, the apparatus is provided with a foil or foils, similar to an aero foil, which is or are disposed beneath the tube and move through the bed whilst the apparatus is dragged therealong. In certain circumstances, it is advantageous to position a second aerofoil at the trailing end of the cutters. Preferably, means are provided for a change in the inclination of the plane of the aerofoil with respect to the surface of the bed of material.

The trench dug by the apparatus or method of the present invention may be left open or filled in by a back fill dozer. Alternatively, the dozer blades for back filling may be arranged so that they can be set so that spoil from the trench is diverted outwardly from the trench leaving a clear trench.

In place of the above-mentioned second aerofoil at the trailing end, one could provide sufficient weight to maintain the trailing end of the apparatus in the bed of material. This is not normally necessary with for example 14% water content sea bed but is necessary, generally, with 11% water content sea bed.

In normal conditions, one should normally expect to lay of the order of 12 foot of pipe or cable per minute with the apparatus and method of the present invention. This is approximately equivalent to 3 miles per 24 hour day.

For a better understanding of the present invention and to show how the same may be put into effect, reference will now be made, by way of example, to the accompanying drawings, in which:

FIG. 1 shows a diagrammatic side view of an apparatus in accordance with the present invention, being towed by a lay barge, FIG. 2 shows a side view of the apparatus shown in FIG. 1, in more detail, FIG. 3 shows a plan view corresponding to FIG. 2, FIG. 4 shows a diagrammatic side view of an apparatus according to the present invention, in a seabed, FIG. 5 shows a sectional view at A—A of FIG. 4, FIG. 6 shows a diagrammatical sectional view at B—B of FIG. 4, FIG. 7 shows a diagrammatic sectional view at C—C of FIG. 4, FIG. 8 shows a sectional view at D—D of FIG. 4, FIG. 9 shows a sectional view at E—E of FIG. 4, and FIGS. 10 and 11 show an alternate tube construction for laying over a pipe on a bed of material.

The apparatus comprises a metal tube 1 of rectangular cross section, one end 2 of the tube, hereinafter referred to as the leading end 2 of the tube 1, having means 3 for attachment to a cable 4 for dragging the tube 1 along the sea bed in a substantially vertical plane containing the axis of the tube 1. Metal tines 5 are attached to the outer surfaces of a lower pair of adjacent walls 6 of the tube 1, which walls 6 are inclined, when viewed in a vertical cross sectional direction through the tube 1, at an angle of approximately 45° to a horizontal plane, in use of the apparatus. The tines 5 form the cutter means of the apparatus and are inclined to the axis of the tube 1 and extend from the tube 1 in a direction towards the leading end 2 of the tube 1 so that when the tube 1 is dragged along the sea bed with the leading end 2 of the tube 1 disposed above the surface of the sea bed and the other end 7 of the tube disposed below said surface the tines 5 remove material from the sea bed to form a trench 8.

Rollers 9 are provided inside the tube 1 for guiding a pipe 10 which is supplied, whilst the tube 1 is dragged along the sea bed, through the tube 1 from the leading end 2 thereof to the other end 7 thereof and thence into the base of the trench 8 which is produced due to displacement of sea bed material by the metal tines 5.

In the particular embodiment illustrated, the tube 1 is provided with means 11 for pivotally supporting skids 12 on either side of the tube 1 whilst it is dragged over the sea bed. The skids 12 are adapted to slide over the surface of the sea bed and may comprise metal plates having upturned end portions. Alternatively, an upturned transverse skid having a forwardly upturned portion can extend between the skids under or in front of the leading end 2 of the tube 1 and extending outwardly from the outwardmost portion of the skids 12. The means 11 for pivotally supporting the skids 12 enables the inclination of the tube 1 relative to the skids 12 to be varied. Thus, the skid supporting means 11 enables the height of the skids 12 above the trailing end 7 of the tube 1 to be altered so that the depth of the trench 8 can be varied. A ram or jack 13 may be mounted on the tube 1 and connected to the skid supporting means 11, for adjusting the inclination of tube 1 relative to the skids 12. The ram or jack 13 may be remote controlled.

In order to maintain the skids 12 on the surface of the sea bed and to ensure the skids 12 assert a downward pressure on the surface of the sea bed whilst the tube 1 is dragged therealong, the apparatus may be provided with a foil or foils 14, similar to an aerofoil, which is or are disposed beneath the tube 1 and which moves or move through the material of the sea bed whilst the tube is dragged therealong. Preferably foils are provided at the front and rear of the apparatus according to the invention. The foils 14 may comprise a metal sheet and, advantageously, the inclination of the plane of the aerofoil of the foils to the surface of the sea bed can be varied to change the length of the portion of the tube disposed below the sea bed and thereby the depth of the trench. The length of the portion of the tube 1 disposed below the sea bed is dependent on the height of the skids 12 above the trailing end 7 of the tube 1. The foils 14 cause the tube 1 to move down into the sea bed until the skids engage the surface of the sea bed. The skids may be ballasted with suitable weight to ensure that they do not rise above the sea bed surface.

An additional method of maintaining contact of the skids 12 with the sea bed would be to have an additional ballasted skid or sledge towed ahead of the laying machine and coupled thereto by a cable or rod. Such an additional ballasted skid or sledge could also be provided with a skeleton plough, preferably just broader than the tube 1 to remove boulders and the like out of the path of the cutters. Alternatively, such a skeleton plough could be provided at the front of the skids, even when the additional ballasted skid or sledge is not provided.

The foils are supported below a portion of the tube, intermediate the ends thereof, by a metal frame 15 which surrounds the tube. The frame 15 is supported on a first pivot 16 at one end of an arm, the other end of which arm is pivoted at a second pivot 18 on a metal support 19 rigidly connected to an outer surface of the upper wall of the tube 1. One end of a lever member 20 is connected to the pivot 18 and the other end of the lever member is, in use of the apparatus, connected to the cable for dragging the apparatus along the sea bed such that the inclination of the cable to the sea bed is varied, the lever member causing the frame to pivot about the first pivot whilst the arm pivots about the second pivot. Due to pivotal movement of the frame, the inclination of the foil to the surface of the sea bed is changed.

In use of the apparatus, the pipe or cable 10 or 21 to be laid is delivered from a lay barge 22 and passes through the tube 1 from the leading end 2 to the trailing end 7 whilst the tube is being dragged along the sea bed (or river bed). The pipe or cable 10 or 21 is guided inside the tube by rollers 23 therein and passes from the trailing end 7 into the trench 8 produced by the tines 5.

The tines 5 may be arranged such that some of the displaced sea bed material passes over the trailing end of the tube onto the pipe as it is delivered into the trench, so that the pipe or cable in the trench is at least partially covered by the material. Some of the displaced material may fall over the walls of the trench into the pipe or cable and an adjustable dozer-type blade 24 may be fitted at the rear of the skids to back fill the trench over the pipe or cable.

Alternatively, the tines may be arranged so that the displaced sea bed material does not pass over the trailing end of the tube onto the pipe or cable as it is delivered into the trench and the dozer-type blades 24 can be adjusted so as to move the displaced material away from the trench, to leave a clear trench.

It is preferred that, in order to prevent displacement material from collecting on top of the tube 1, the cross section thereof be rectangular, the walls of the tube, as viewed in a vertical section through the tube, being disposed at 45° to the horizontal plane whilst the tube is dragged along the sea bed. Alternatively, the tube may be of triangular cross section, a bottom wall of the tube, as viewed in a vertical section through the tube, being disposed on a substantially horizontal plane. Each of the outer surfaces of the walls of the tube of triangular cross section may have tines extending therefrom. Alternatively, the orientation of the tube during the pipe or cable laying operation, may be such that one edge of the tube is disposed at the base of the trench to provide a generally "V" shaped trench cut by the tines. As a further alternative, the tube may be of circular cross section.

The apparatus according to the present invention may also be provided with means, in addition to the foil, to ensure that the skids remain on the sea bed.

The tines provided on the tube may be adjustable to vary the depth of cut thereof. Thus, the tines may be connected to a lever arrangement (not shown) which withdraws the tines towards the outer surface of the tube, or extends the tines from the outer surface of the tube, depending on inclination of the cable which drags the tube along the sea bed. This provides an alternative method of varying the depth of the trench and can also be used to ensure that the skids remain on the sea bed.

The method and apparatus of the present invention enables a pipe or cable to be laid in a sea bed or river bed at a substantially constant depth. The tube through which the pipe or cable passes protects the pipe during laying thereof and the entire pipe or cable laying operation can be carried out relatively quickly since the trench is produced simultaneously with the laying of the pipe or cable.

I claim:

1. A method of laying an elongate member in a bed of material, which method comprises moving an elongated generally straight tube along the bed of material so that a plurality of cutter means mounted in generally parallel spaced relationship with one another along the outer surface of the tube shaves material from the bed of material to form a trench therein, a leading end portion of the tube being disposed above the surface of the bed of material and a portion of the other end of the tube being disposed below the surface of the bed of material, the depth of dig being controllable by virtue of adjustable skid means mounted on the tube, and supplying the member to be laid, during movement of the tube, through the tube from the leading end thereof to the other end thereof and into the base of the trench formed.

2. The method of claim 1, in which at least the cutter means are vibrated.

3. The method of claim 1, in which jets of a fluid are directed against the bed of material to assist the cutting of the bed of material by the cutter means.

4. The method of claim 1, in which the tube is moved along the bed of material by a lay barge, utilizing two crossed towing cables.

5. An apparatus for laying an elongate member in a bed of material, which apparatus comprises an elongated generally straight tube having a plurality of cutter means mounted in generally parallel spaced relationship with one another along the outer surface thereof, the plurality of cutter means being arranged to shave material from a bed of material to form a trench therein when the tube is moved along the bed of material, adjustable skid means mounted on the tube to dispose the leading end portion of the tube above the surface of the bed of material and a portion of the other end of the tube below the surface of the bed of material, and to control the depth of dig, the tube being adapted to receive the member to be laid in the bed of material, which member is supplied, during movement of the tube, through the tube from the leading end thereof to the other end thereof and into the trench formed by the plurality of cutter means.

6. The apparatus of Claim 5, in which the cutter means comprises tines.

7. The apparatus of Claim 5, in which the tube is of generally rectangular cross section, the cutter means being provided on at least two faces of the tube.

8. The apparatus of Claim 5, in which the skid means includes skids disposed on either side of the tube.

9. The apparatus of Claim 5, in which foils are provided beneath the tube for moving through the bed while the apparatus is dragged therealong to ensure penetration of the cutter means into the bed of material to the desired degree.

10. The apparatus of Claim 5, in which a wide front skid is provided with an upturned front portion to stabilise the apparatus.

11. The apparatus of Claim 5, in which a skeleton plough is provided ahead of the cutter means to remove boulders from the path of the cutter means.

* * * * *